R. C. Robbins,
Pipe Coupling,
Nº 37,425. Patented Jan. 13, 1863.
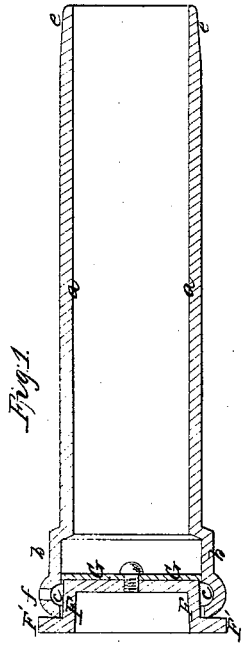
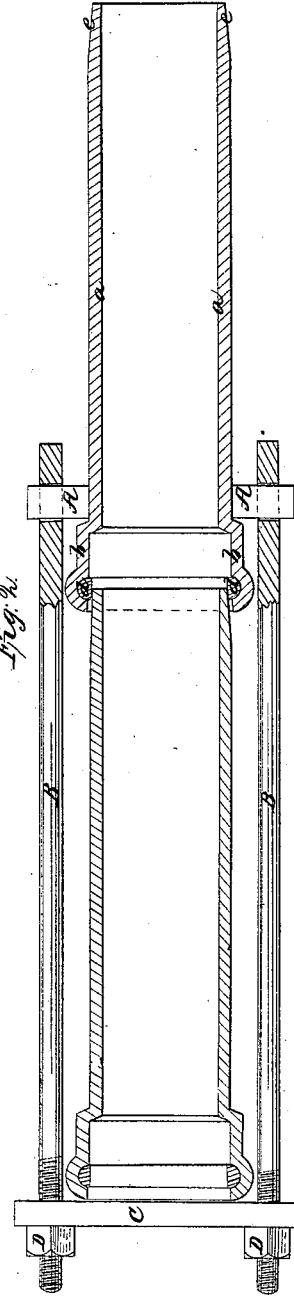
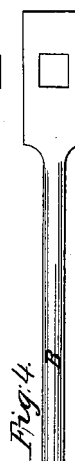
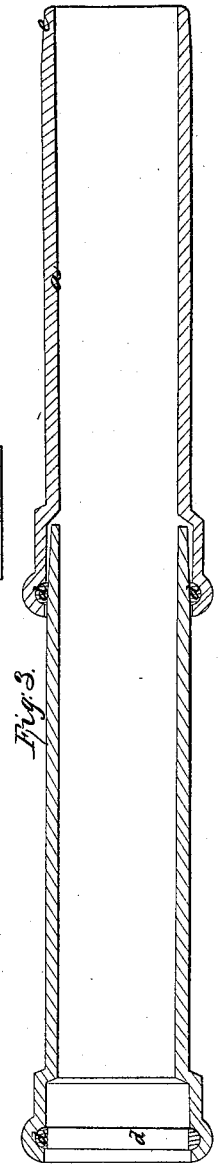
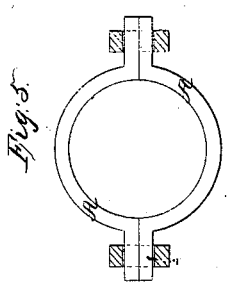
Witnesses.
George W. Kim
Albert H. Horr

UNITED STATES PATENT OFFICE.

RICHARD C. ROBBINS, OF JERSEY CITY, NEW JERSEY.

IMPROVEMENT IN GAS-PIPE JOINTS.

Specification forming part of Letters Patent No. 37,425, dated January 13, 1863.

*To all whom it may concern:*

Be it known that I, RICHARD C. ROBBINS, of Jersey City, county of Hudson, State of New Jersey, have invented a new Mode of Forming an Air and Water Tight Joint in Water and Gas Pipes; and I hereby declare the following to be a clear and full description thereof, reference being had to the annexed drawings, in which—

Figure 1 shows the pipe ready for receiving the lead. Fig. 2 represents the operation of making the joint and the required tool for that purpose. Fig. 3 shows the pipes with their joints completed. Figs. 3 and 4 are detached views of the tool for forcing the pipe into the mouth of the preceding one.

In all figures the pipes are shown in section.

The present mode of making the joints in gas or water pipes is an expensive one on account of the great quantity of lead used and the time it takes to perform the work, and when used for gas it is apt to leak after the ammonia of the gas has dissolved the soft packing used in front of the lead. My plan obviates the danger of leakage, and is greatly cheaper as the quantity of lead I use is no more than one-third of that used in the old mode, and the time required to form the joint when the pipes are in the ditch is also less.

Referring to the drawings, letter $a$ represents the pipe. It is formed with an enlargement, $b$, similar to the present shape; but at the extreme end of this enlargement there is a circular groove, $c$, provided in the interior or orifice, and in this groove $c$, I cast a round ring of lead, $d$. The other end $e$, of the pipe $a$ is formed somewhat conical or tapering, so that this end $e$ can be inserted in the orifice of the enlargement $b$ of the preceding pipe, where it will just enter the lead ring $d$. Now, in order to make this joint tight, this end $e$ of the pipe is forced into the lead ring $d$ by means of a tool, which is clearly shown in Figs. 2, 4, and 5, and consists of a clamp, A, made in halves which is adjusted around the preceding pipe next to the shoulder of the enlargement thereof. To this clamp I attach two rods, B, one on each side of the pipe, which extend beyond the pipe which is to be driven into the preceding one terminating in screws. A follower, C, is then put over these rods, and by the nuts D the pipe can be forced into the lead ring $d$, and the end $e$ of the pipe being tapering it will force the lead out, compress it, and form a perfectly-tight joint all round.

The great advantage gained by my plan is that the lead ring $d$ can be cast in the grooves of each pipe ready for jointing in any convenient place, and the operation of jointing can then be done as rapidly as the pipes can be delivered in the ditch.

To secure the perfect working of the plan, it is necessary that the conical ends of the pipes should be all of uniform size and taper, which is easily obtained by casting these ends in iron molds commonly called "chills," and it is also necessary that the orifices of those lead rings $d$ should be all alike, and this I accomplish by inserting in the mouth or enlargement of pipe $a$ an iron core or plug, F, as shown in Fig. 1, made so as to be of the same taper as but a little smaller than the conical end of the pipe. The lead is then poured into the groove $b$ through a hole or spout, $f$. The flange F' of the plug prevents it from running out in front, and an india-rubber washer, G, fastened in any convenient way to the end of the plug and filling the orifice of the enlargement of the pipe just behind the groove, stops the passage of the lead in that direction, and also serves to hold the plug in the central position in the pipe.

Having now fully described my invention, what I claim therein as new, and desire to secure by Letters Patent, is—

The method of forming the packing by means of casting lead or other suitable material in a circular groove in the mouth of the socket of a pipe, and into which the tapering end of the succeeding pipe is intended to be forced, in the manner and for the purpose substantially as set forth.

RICHARD C. ROBBINS.

Witnesses:
GEORGE W. KEEN,
ALBERT H. HOOK.